US008397908B2

(12) United States Patent
Libohova

(10) Patent No.: US 8,397,908 B2
(45) Date of Patent: Mar. 19, 2013

(54) STORAGE DEVICE FOR STORING MULTIPLE RECORDED MEDIA

(75) Inventor: Agjah I. Libohova, East Setauket, NY (US)

(73) Assignee: Viva Onetime Limited, Nassau, New Providence (BS)

( * ) Notice: Subject to any disclaimer, the term of this patent is extended or adjusted under 35 U.S.C. 154(b) by 15 days.

(21) Appl. No.: 11/603,643

(22) Filed: Nov. 22, 2006

(65) Prior Publication Data

US 2007/0114147 A1 May 24, 2007

Related U.S. Application Data

(60) Provisional application No. 60/738,850, filed on Nov. 22, 2005.

(51) Int. Cl.
*B65D 85/57* (2006.01)
(52) U.S. Cl. .................. 206/307.1; 206/308.1; 206/310
(58) Field of Classification Search ............... 206/307.1, 206/15, 308.1, 308.2, 309–312; 220/337
See application file for complete search history.

(56) References Cited

U.S. PATENT DOCUMENTS

| 4,844,260 | A | * | 7/1989 | Jaw | 206/308.3 |
|---|---|---|---|---|---|
| 5,782,348 | A | | 7/1998 | Burdett | |
| 5,799,784 | A | * | 9/1998 | Bosworth | 206/308.1 |
| 5,831,968 | A | * | 11/1998 | Tanaka | 720/727 |
| 5,845,771 | A | | 12/1998 | Fu | |
| 6,408,486 | B1 | | 6/2002 | Saliba et al. | |
| 7,520,384 | B2 | * | 4/2009 | Zajec et al. | 206/308.1 |
| 2002/0014421 | A1 | | 2/2002 | Byrne et al. | |
| 2004/0173477 | A1 | | 9/2004 | Lax et al. | 206/307 |
| 2004/0195123 | A1 | | 10/2004 | Bird et al. | |
| 2005/0241970 | A1 | | 11/2005 | Choi | |

OTHER PUBLICATIONS

International Search Report and Written Opinion for PCT/US06/45283, dated Jul. 18, 2008, 11 pages.

* cited by examiner

*Primary Examiner* — J. Gregory Pickett
*Assistant Examiner* — Ernesto Grano
(74) *Attorney, Agent, or Firm* — Ostrolenk Faber LLP

(57) ABSTRACT

A storage device for multiple optical discs in accordance with an embodiment of the present invention includes a front cover, a back cover, and a spine rotatably connecting the front cover and the back to allow for rotation between a closed position and an open position. A tray is rotatable coupled to the spine between the front and back covers and includes a first hub on a first surface operable to retain a first disc, and a second hub on a second surface operable to hold a second disc. The second hub is offset from the first hub such that the first disc does not overlap the second hub and the second disc does not overlap the first hub. A second tray may be rotatably coupled to the spine between the front and back covers, adjacent to the first tray. The second tray preferably includes a third hub on a first surface operable to retain a third disc and a fourth hub on a second surface operable to retain a fourth disc. The fourth hub is offset from the third hub such that the third disc does not overlap the fourth hub and the fourth disc does not overlap the third hub.

38 Claims, 7 Drawing Sheets

STORAGE DEVICE FOR STORING MULTIPLE RECORDED MEDIA

CROSS REFERENCE TO RELATED APPLICATIONS

The present application claims benefit of and priority to U.S Provisional Patent Application No. 60/738,850 entitled STORAGE DEVICE FOR MULTIPLE RECORDED MEDIA filed Nov. 22, 2005, the entire contents of which are hereby incorporated by reference herein.

BACKGROUND OF THE INVENTION

1. Field of the Invention

The present invention relates to a storage device for the storage of multiple recorded media such as DVD's, CD's or the like. More specifically, the present invention relates to a storage device that can store up to 6 recorded media or discs wherein the width of the storage device does not exceed the standard 15 mm width of a conventional storage device.

2. Description of the Related Art

Studios and other content providers have been selling more and more multi-disc DVD titles in recent years, especially with the release of popular TV series. Packaging for these titles are quite varied as compared with the standard new movie release DVD's. Most of these packages are a combination of paperboard and plastic and are expensive and bulky. Retailers have difficulty displaying the media due to the varying size configurations. Some packaging companies are currently offering 2-3 and even 4 disc configurations in the standard 15 mm DVD "Amaray" style case.

In conventional multiple disc storage cases, the case includes a front cover and a back cover rotatably connected to each other by a spine. One or more trays are rotatably connected to the spine to be between the front cover and the back cover. Each tray typically includes a first hub for securing a disc formed on a first or front surface of the tray and a second hub for securing a disc formed on a second or rear surface of the tray. However, in such storage cases, the first and second hubs are generally positioned such that the disc secured by one hub overlaps the second hub. Such a tray is illustrated in FIG. 4. A problem arises, however, when more than one of the prior art trays is used to store multiple discs. In this situation, the case is closed and the trays are positioned adjacent to each other. In the closed position, the raised hub of one of the trays contacts a disc of the other tray and in order to ensure that the case properly closes, the width of the case must be increased. This increase in the width of the disc storage case makes storage and display of the storage case inconvenient. Thus, it would be desirable to provide a storage device for discs, such as DVDs, that avoids the problems mentioned above.

SUMMARY

It is an object of the present invention to provide a storage device for the storage of multiple discs on preferably two trays that secure the discs. Each tray includes two hubs for securing the discs in the storage device, wherein a first hub is positioned on a first surface of the tray and a second hub is positioned on a second surface of the tray opposite the first surface and wherein the second hub is positioned on the second surface offset from the first hub such that a disc stored on the first hub does not overlap the second hub and where a disc stored on a hub of a first tray does not overlap an opposing hub of a second tray. In an example embodiment, the first and second hubs are offset by about 70 mm.

A storage device for multiple discs in accordance with one embodiment of the present invention includes a front cover, a back cover, a spine rotatably connecting the front cover and the back cover such that front cover and back cover are rotatable between an open position and a closed position and wherein a compartment is formed between the front cover and the back cover when they are in the closed position and a first tray, rotatably coupled to the spine between the front cover and the back cover such that the first tray is positioned in the compartment formed by the front cover and back cover when they are in the closed position. The first tray further includes a first hub, positioned on a first surface of the first tray and operable to retain a first disc, and a second hub, positioned on a second surface of the first tray, opposite the first surface, and operable to hold a second disc, wherein the second hub is offset from the first hub such that the first disc does not overlap the second hub and the second disc does not overlap the first hub.

A storage device for multiple optical discs in accordance with another embodiment of the present invention includes a front cover, a back cover, a spine rotatably connecting the front cover and the back cover such that the front cover and back cover are rotatable between an open position and a closed position and wherein a compartment is formed between the front cover and the back cover when they are in the closed position and a first tray, rotatably coupled to the spine between the front cover and the back cover such that the first tray is positioned in the compartment formed by the front cover and back cover when they are in the closed position. The first tray includes a first hub, positioned on a first surface of the first tray and operable to retain a first optical disc, and a second hub, positioned on a second surface of the first tray, opposite the first surface, and operable to hold a second optical disc, wherein the second hub is offset from the first hub such that the first optical disc does not overlap the second hub and the second optical disc does not overlap the first hub. An opening is formed in the first tray in an area where the first optical disc and the second optical disc overlap each other.

A storage device for the storage of multiple discs in accordance with another embodiment of the present invention includes a first tray operable to secure discs and a second tray operable to secure discs. Each tray includes two hubs for securing the discs in the storage device, wherein a first hub is positioned on a first surface of each tray and a second hub is positioned on a second surface of each tray, opposite the first surface, and wherein the second hub is positioned on the second surface offset from the first hub such that a disc stored on the first hub does not overlap the second hub and a disc stored on one of the first and second hubs of the first tray does not overlap an opposing hub of the second tray.

Other features and advantages of the present invention will become apparent from the following description of the invention, which refers to the accompanying drawings.

BRIEF DESCRIPTION OF THE DRAWING(S)

Figure 7:
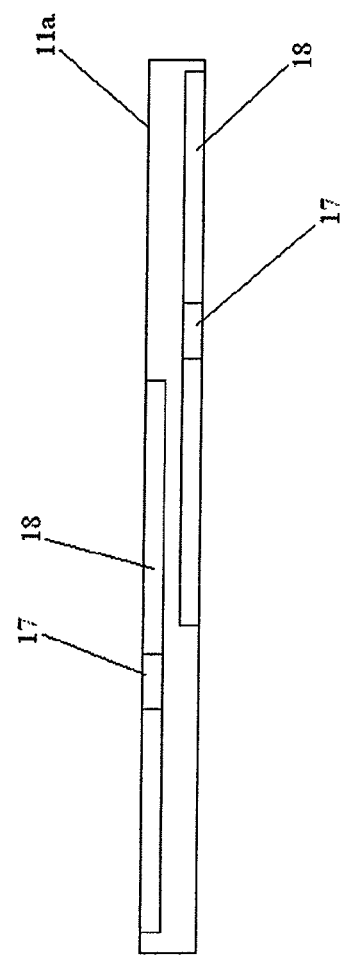

FIG. 7 discloses a cross-sectional view of two overlapping depressions in a tray of a storage device according to the present invention.

DESCRIPTION OF THE EMBODIMENTS

The storage device 10 of the present invention may be used in conjunction with any known storage case for recorded media. An example of such a storage case is illustrated and described in U.S. Patent Publication No. 20040173477, Ser. No. 10/796,332 filed Mar. 8, 2004 entitled CASE WITH INTERNAL LOCK, the entire contents of which are hereby incorporated by reference herein.

The storage device 10 of the present invention may be configured to store any number of discs. In example embodiments, the storage device 10 can store 5 or 6 discs depending on whether the inside front cover is needed to hold a booklet or other literature. The storage device is similar to a standard DVD library package made in polypropylene, except for the hubs used to hold the discs in place in the storage device 10 and the clips 31 that secure the trays 11a, 11b, described below, on the spine of the storage device.

Figure 1:
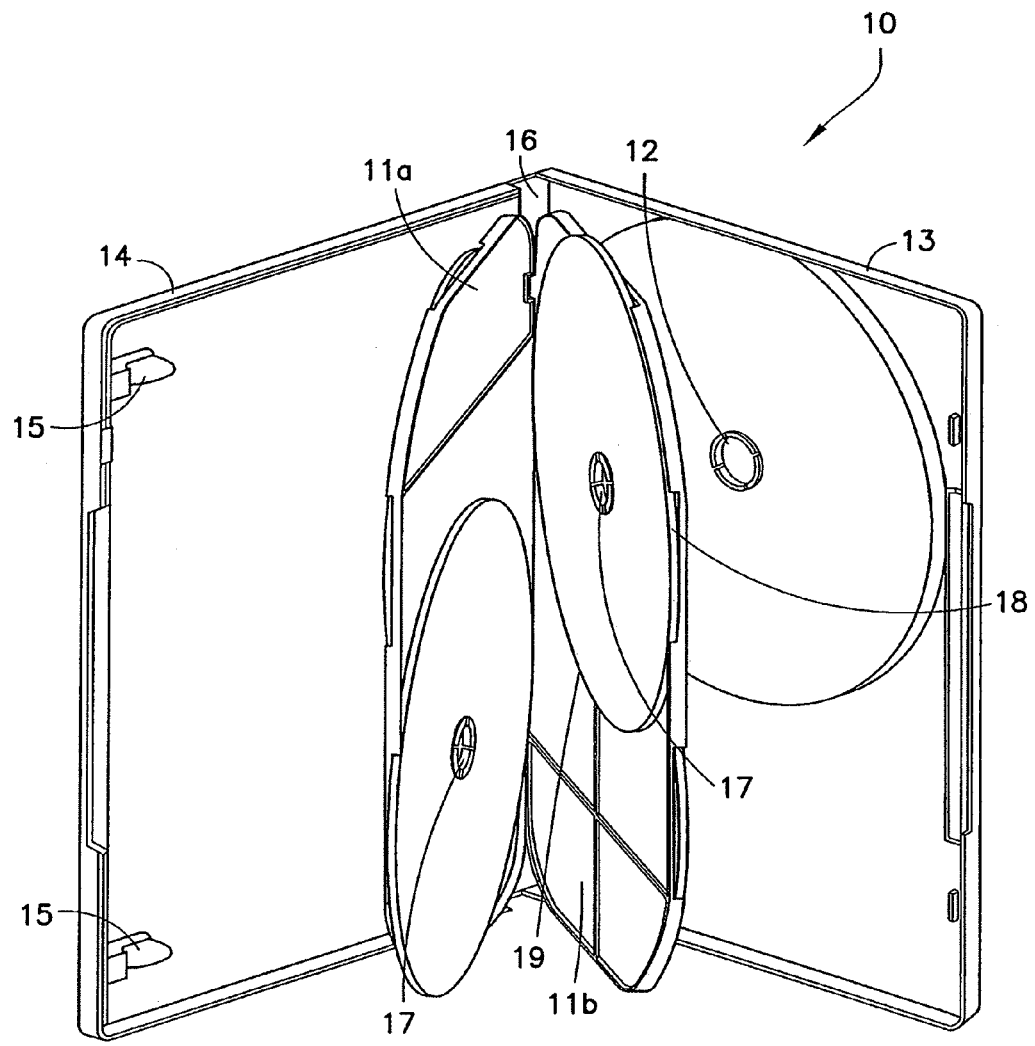
FIG. 1 is an illustration of a storage device for multiple discs in accordance with one embodiment of the present invention.

In one example embodiment, illustrated in FIG. 1, two trays 11a, 11b are snapped into a clip 31 (see FIG. 3) disposed on the spine 16 of the storage device 10. Preferably each tray will hold two 120 mm discs, with one disc on each side of the tray. Since two trays are used, the trays may hold a total of 4 discs. A low profile hub 12 may be molded offset into the inner surface of the base side, or back cover 13 of the storage device so as not to interfere with the stack of 4 discs held by the trays 11a, 11b. The front side, or front cover 14 of the storage device 10 may include, on the inner surface thereof, the usual clips 15 that commonly hold a booklet related to the content of the discs. In this embodiment, therefore, the storage device 10 may hold a total of 5 discs.

Figure 2:
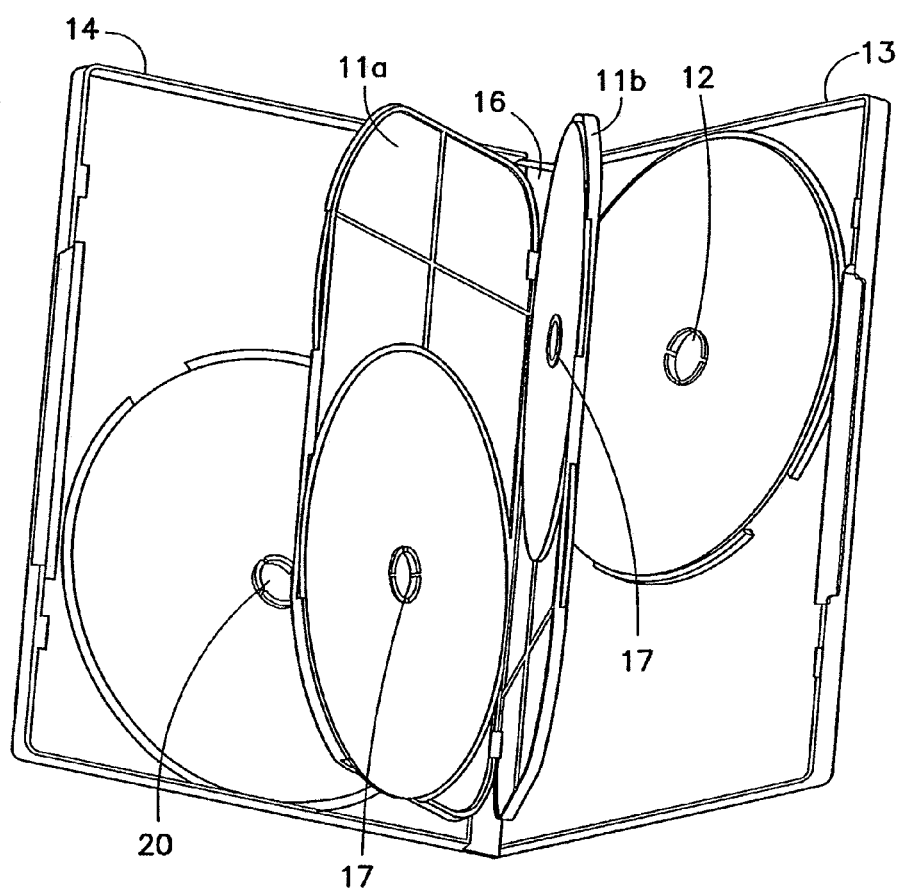
FIG. 2 is an illustration of a storage device for multiple discs in accordance with another embodiment of the present invention.

In an alternative embodiment, illustrated in FIG. 2, the clips 15 can be removed from the front cover 14 of the storage device 10 and an additional hub 20 may be situated offset on the inner surface of the front cover so that the multiple disc storage device can store a total of 6 discs.

The total thickness of the trays 11a, 11b, even when six discs are stored in the storage device 10 does not exceed the internal dimensions of the compartment formed by the back cover 13 and front cover 14 of the storage device. This allows for a 15 mm thick package, which is generally the standard for DVD media storage cases.

More specifically, the storage device of the present invention preferably includes the front cover 14 and the back cover 13, each of which are rotatably connected to each other via the binding, or spine 16. The front and back covers 14, 13 may be rotated between an open position, in which the front cover and back cover are substantially separated from one another, as illustrated in FIGS. 1 and 2, and a closed position in which the front cover and back covers are substantially adjacent to one another. When in the closed position, the compartment is preferably formed between the front cover 14 and the back cover 13, in which trays 11a and 11b are positioned.

The trays 11a, 11b are connected to the spine 16 at an inner edge of the trays such that the trays fit completely within the compartment formed by the front cover 14 and back cover 13 when in the closed position. In a preferred embodiment, each of the trays 11a, 11b has two hubs 17 formed therein, each of which may be used to secure a disc. Preferably, a first hub is positioned on a first surface, or front surface of each tray. A second hub, is positioned on a second surface, or rear surface, opposite the front surface and is offset from the first hub such that a disc secured by the first hub does not overlap the second hub. Similarly, a disc secured by the second hub does not overlap the first hub.

Preferably, the hubs 17 are positioned such that the hubs on each surface of the tray are offset by about 70 mm. In this configuration, the discs secured in each of the hubs do not overlap the opposite hub. Utilizing the configuration of the storage device of the present invention, a disc secured on the second hub of tray 11a, for example, also does not overlap the first hub of the tray 11b. Thus, the trays 11a and 11b can be positioned adjacent to each other while avoiding interference between the discs stored on one tray and the hubs formed on the other tray. As a result, the width of the storage device 10 can conform to the standard 15 mm width used by the known DVD storage cases. The hubs 12 and 20 formed on the back cover 13 and the front cover 14, respectively, are similarly offset to avoid interference between the hub 12 and a disc stored on the second hub of tray 11b and the hub 20 and a disc stored on the first hub of tray 11a.

The hubs 17 engage the disc at the center portion thereof, with the hub extending up through the center hole of the disc. A depression 18 may be formed in the tray 11a, 11b around the hub 17 in which the disc is positioned. A lip 19 may be raised around the outer periphery of the disc to help protect the disc from damage while in storage. As a result, the total thickness of the tray in the area between the hubs where the discs on opposite sides of the tray overlap is very thin, since the depression 18 in which the disc stored on one side of the tray and the depression 18 in which the disc stored on the other side of the tray coincide in this area.

In order to provide a storage device capable of storing 6 discs, the distance between discs secured on hubs on opposite sides of a tray is only approximately 0.5 mm. Thus, the thickness of the tray in the area where the discs overlap can only be a maximum of 0.5 mm. However, practically speaking, it is very difficult to manufacture a tray, by injection molding, for example, which includes an area in which the thickness of the tray is only 0.5 mm. Therefore, in the present invention, this area of the tray is preferably removed, resulting in a window 21 formed in the tray in the area where the discs on opposing sides of the tray overlap, FIG. 5. The tray illustrated in FIG. 5 may be used as the trays, 11a, 11b of the storage device 10 illustrated in FIGS. 1 and 2 described above. FIG. 6 is a photograph of a tray substantially similar to that illustrated in FIG. 5. In FIG. 6, a disc is secured on a hub 17 on the opposite side of the tray 11a, 11b and is clearly visible through the window in the tray. Utilizing this concept for the tray 11a, 11b, the molding of the tray is simplified and the overall weight of the storage device 10 also decreases.

Figure 3:
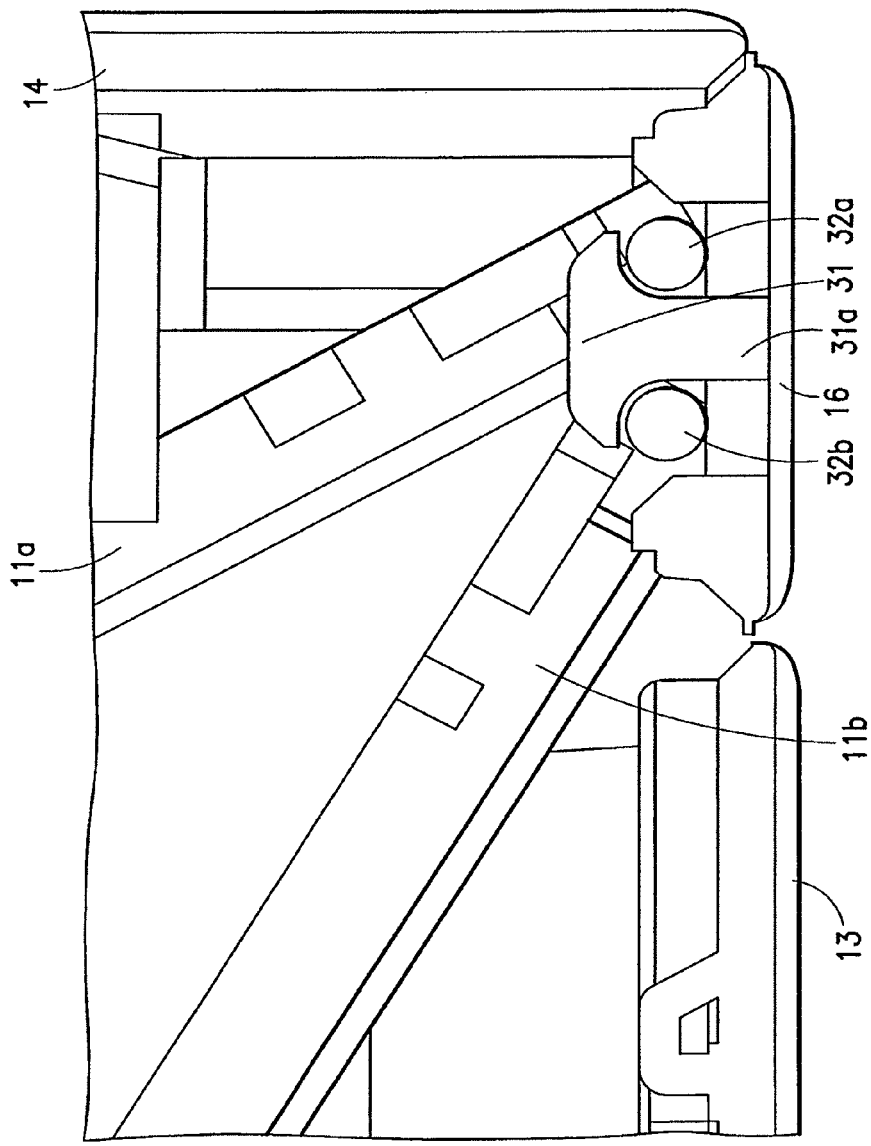
FIG. 3 is an illustration of a T-shaped clip for use in the storage devices illustrated in FIGS. 1 and 2.
Figure 4:
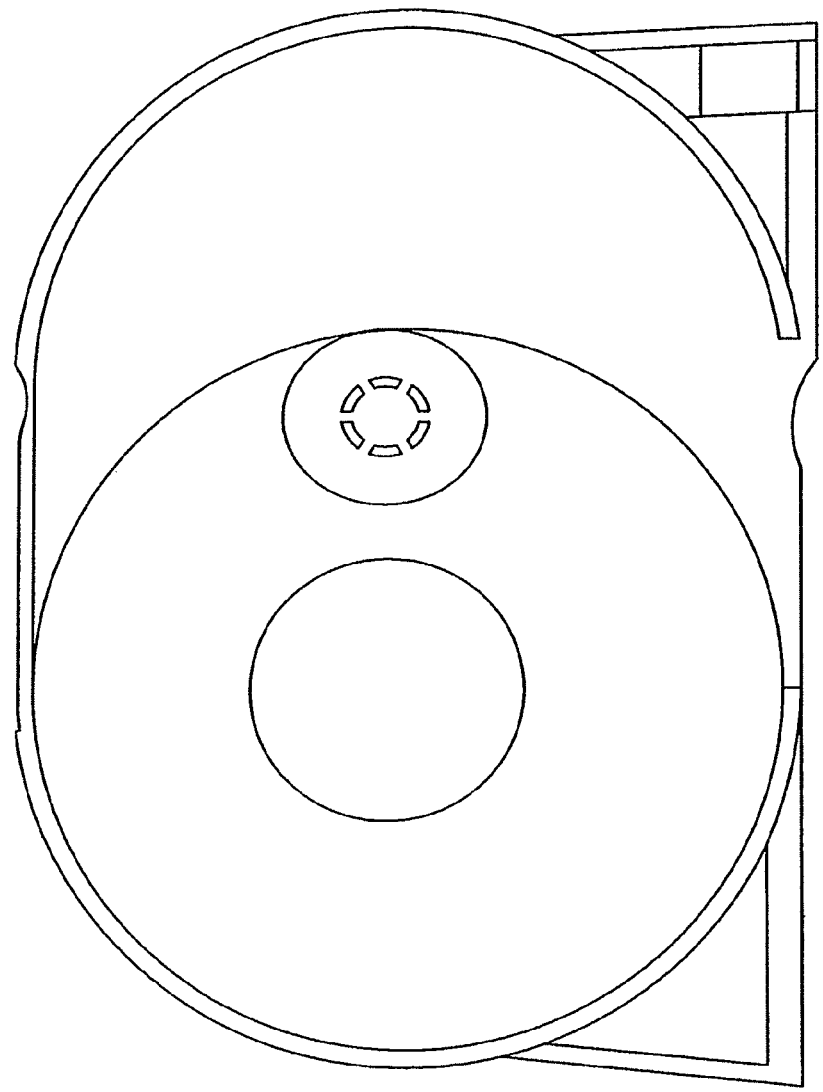
FIG. 4 is a photograph of a tray of a conventional disc storage case.
Figure 5:
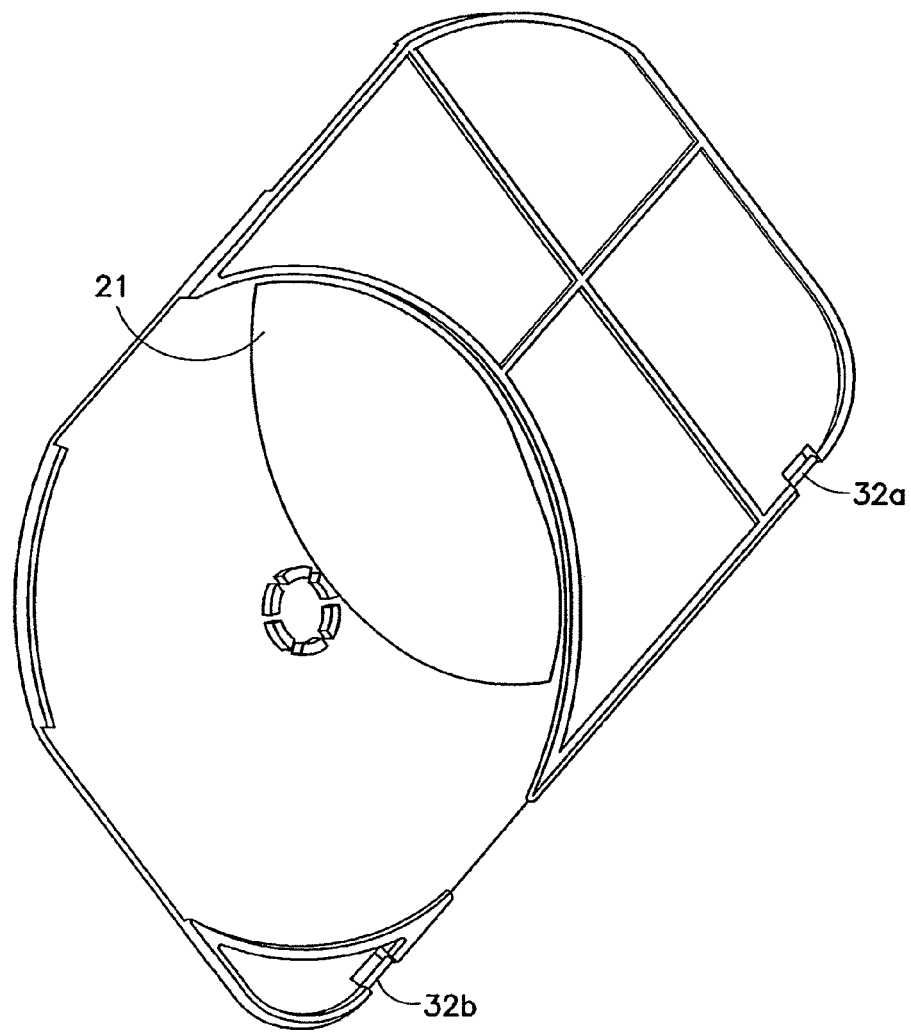
FIG. 5 is an illustration of a tray for use in the storage devices of FIGS. 1 and 2.
Figure 6:
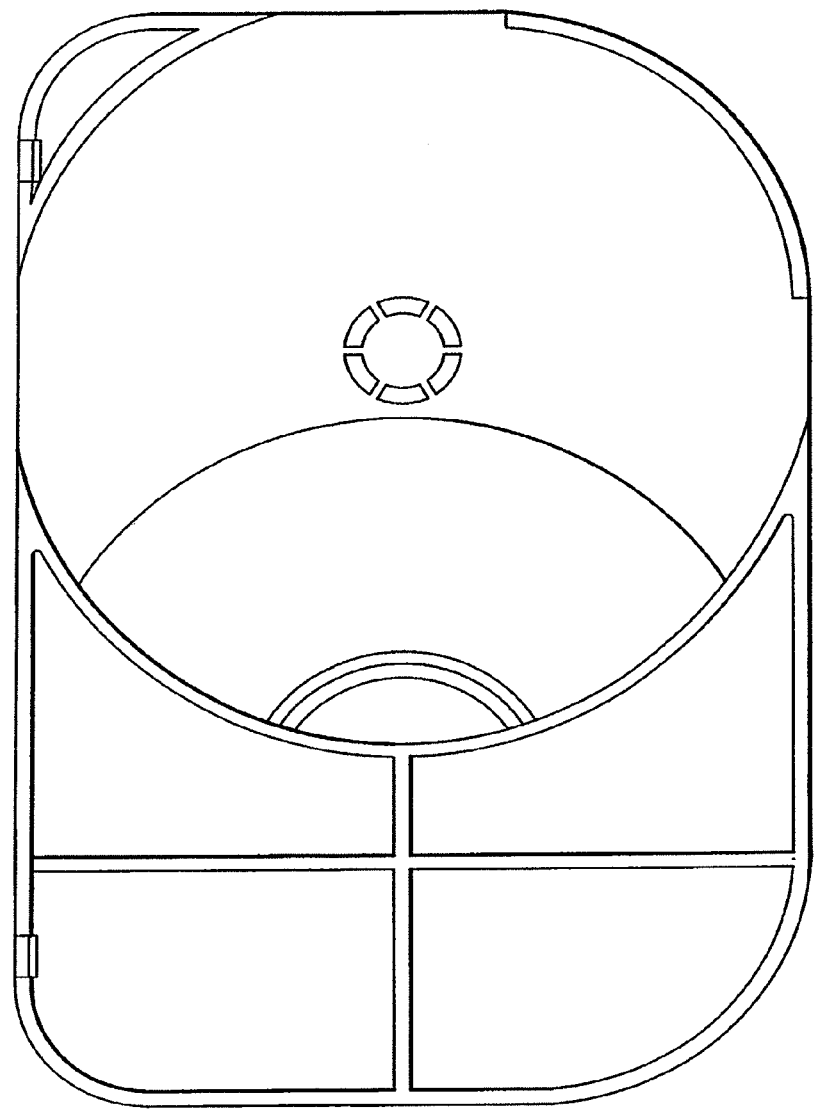
FIG. 6 is a photograph of a tray substantially similar to that illustrated in FIG. 5.

Referring now to FIGS. 3 and 5, in order to assemble and allow for the trays 11a, 11b to fold and nest properly in the storage device 10 when the storage device 10 is closed, a "T" shaped clip 31, illustrated in FIG. 3, is preferably provided at the top and bottom of an inner surface of the spine 16. Each of the trays 11a, 11b have a rod shaped feature 32a, 32b positioned on the top and bottom of the trays and parallel to the inner edges of the trays. The rod shaped features 32a, 32b engage and rotate on either side of the T-shaped clip. One tray 11a is prevented from interfering with the other tray 11b by the base 31a of the T-shaped clip 31. Thus, the trays 11a, 11b are freely rotatable, for example, when the front cover 14 and the back cover 13 are in the open position, such that a user can easily access any of the discs secured on the hubs 17 of the trays 11a, 11b. Preferably, the rods 32a, 32b of the trays 11a, 11b are snapped into the T-shaped clip 31, for example as illustrated in FIG. 3, but can engage the trays 11a, 11b by any of the known methods.

The disc storage device in accordance with the present invention has the advantages described above, and also reduces the cost of manufacture and allows for easy display and storage of recorded media.

It is noted that while the present application makes specific reference to 120 mm discs, the present invention would be equally applicable to other recording media of different sizes, particularly other optical recording media. That is, where multiple optical recording media are stored in a single container, it is beneficial to ensure that the hub used to hold one disc does not interfere with other media in the container. That is, regardless of the specific size of the media, it would be beneficial to offset hubs used to retain the media by whatever amount is appropriate to avoid interference between the hubs and the media of opposing trays in the container.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A storage device for multiple discs comprising:
a front cover;
a back cover;
a spine connecting the front cover to the back cover such that front cover and back cover are pivotable with respect to the spine between an open position and a closed position the front cover contacting the back cover in the closed position to define a storage compartment; and
a first tray connected to the spine; the first tray being pivotable with respect to the spine while remaining connected to the spine; the first tray being disposed within the storage compartment between the front cover and the back cover when the front and back covers are in the closed position;
a first hub, positioned on a first surface of the first tray and operable to retain a first disc, and a second hub, positioned on a second surface of the first tray, opposite the first surface, and operable to hold a second disc, wherein the second hub is offset from the first hub a first support structure positioned behind the first hub on the second surface and comprising first raised regions that are raised relative to the second surface and extend to an edge of the second surface; and
a second support structure position behind the second hub on the first surface and comprising second raised regions that are raised relative to the first surface and extend to an edge of the first surface; wherein the first hub and the second hub are positioned relative to one another so that the first disk and the second disk overlap a first region of the first tray, the first disk overlaps a second region of the first tray, and the second disk overlaps a third region of the first tray, wherein the first region is thinner than the second region and the third region or includes a window, and wherein the first disk does not overlap the third region, and the second disk does not overlap the second region.

2. The storage device for multiple discs of claim 1, further comprising:
a second tray connected to the spine between the front cover and the back cover, adjacent to the first tray, such that the first tray and second tray are positioned within the storage compartment formed by the front cover and the back cover when they are in the closed position;
the second tray being pivotable with respect to the spine while remaining connected to the spine;
wherein the second tray further comprises a third hub, position on a first surface of the second tray and operable to retain a third disc, and a fourth hub, positioned on a second surface of the second tray, opposite the first surface, and operable to retain a fourth disc, wherein the fourth hub is offset from the third hub such that the third disc does not overlap the fourth hub and the fourth disc does not overlap the third hub; and
wherein the second tray is positioned in the storage compartment adjacent to the first tray such that the first surface of the second tray is opposite the second surface of the first tray and such that the second disc does not overlap the third hub of the second tray and the third disc does not overlap the second hub of the first tray.

3. The storage device for multiple discs of claim 2, further comprising a fastening device connected to an inner surface of the spine and operable to pivotably connect the first tray and the second tray to the spine such that both the first tray and the second tray are freely pivotable relative to the spine while remaining connected to the spine.

4. The storage device for multiple discs of claim 3, wherein the fastening device further comprises a first T-shaped clip positioned on a top end of an inner surface of the spine and a second T-shape clip positioned on a bottom end of the inner surface of the spine, wherein each of the first and second T-shaped clips includes a base element that extends substantially perpendicularly upward from a plane of the spine and a cross element positioned at a top of the base element and extending substantially parallel to the plane of the spine, such that a first recess and a second recess are formed on opposite sides of the base element.

5. The storage device for multiple discs of claim 4, wherein the first tray includes a first rod member on a top portion of an inner edge of the first tray and a second rod member on a bottom portion of the inner edge of the first tray, wherein the first rod member and second rod member fit into at least one of the first recess and the second recess of each of the first T-shaped clip and the second T-shaped clip to allow for pivoting of the first tray relative to the spine.

6. The storage device for multiple discs of claim 5, wherein the second tray includes a third rod member on a top portion of an inner edge of the second tray and a fourth rod member on a bottom portion of the inner edge of the second tray, wherein the third rod member and fourth rod member fit into the other of the first recess and second recess of each of the first and second T-shaped clips to allow for pivoting of the second tray relative to the spine.

7. The storage device for multiple discs of claim 6, wherein an opening is defined by the first tray in an area in which the first disc and the second disc overlap each other.

8. The storage device for multiple discs of claim 7, wherein an opening is defined by the second tray in an area in which the third disc and fourth disc overlap each other.

9. The storage device for multiple discs of claim 5, wherein the back cover of the storage device further comprises a fifth hub operable to retain a fifth disc, wherein the fifth hub is positioned on an inner surface of the back cover, opposite the second surface of the second tray, and is offset from the fourth hub of the second tray such that the fourth disc does not overlap the fifth hub and the fifth disc does not overlap the fourth hub.

10. The storage device for multiple discs of claim 9, wherein the front cover further comprises a sixth hub operable to retain a sixth disc, wherein the sixth hub is positioned on an inner surface of the front cover opposite the first surface of the first tray, and is offset from the first hub of the first tray such that the first disc does not overlap the sixth hub and the sixth disc does not overlap the first hub.

11. The storage device of claim 10, wherein a thickness of the storage device when the front cover and the back cover are in the closed position is substantially 15 mm.

12. The storage device of claim 9, wherein the front cover further comprises at least one retaining clip operable to retain printed information regarding the multiple discs.

13. The storage device of claim 12, wherein a thickness of the storage device when the front cover and the back cover are in the closed position is substantially 15 mm.

14. The storage device of claim 2, wherein the first hub is offset from the second hub by substantially 70 mm and wherein the fourth hub is offset from the third hub by substantially 70 mm.

15. The storage device for multiple disks according to claim 2, further comprising a depression around each hub, the depressions overlapping in an area between the hubs.

16. The storage device for multiple disks according to claim 1, further comprising a depression around each hub, the depressions overlapping in an area between the hubs to define the first region.

17. The storage device for multiple disks according to claim 1, further comprising a depression around each hub, the depressions overlapping in an area between the hubs, and defining the window.

18. A storage device for multiple discs according to claim 1, wherein the first raised regions and the second raised regions comprise ribs.

19. A storage device for multiple discs according to claim 1, further comprising a first arcuate rib at the first region of the first tray on the first surface of the first tray and a second arcuate rib at the first region of the first tray on the second surface of the first tray.

20. A storage device for multiple optical discs comprising:
a front cover;
a back cover;
a spine connecting the front cover to the back cover such that the front cover and back cover are pivotable with respect to the spine between an open position and a closed position the front cover contacting the back cover in the closed position to define a storage compartment;
a first tray connected to the spine; the first tray being pivotable with respect to the spine while remaining connected to the spine; the first tray being disposed in the storage compartment between the front cover and the back cover when the front and back covers are in the closed position;
a first hub, positioned on a first surface of the first tray and operable to retain a first optical disc, and a second hub, positioned on a second surface of the first tray, opposite the first surface, and operable to hold a second optical disc, wherein the second hub is offset from the first hub;
a first support structure positioned behind the first hub on the second surface and comprising first raised regions that are raised relative to the second surface and extend to an edge of the second surface; and
a second support structure positioned behind the second hub on the first surface and comprising second raised regions that are raised relative to the first surface and extend to an edge of the first surface; wherein the first and the second hub are positioned relative to one another so that the first disk and the second disk overlap a first region of the first tray, the first disk overlaps a second region of the first tray and the second disk overlaps a third region of the first tray, wherein the first region is thinner than the second region and the third region or includes a window, and wherein the first disk does not overlap the third region and the second disk does not overlap the second region; and
wherein an opening is defined by the first tray in an area where the first optical disc and the second optical disc overlap each other.

21. The storage device for multiple optical discs of claim 20, further comprising:
a second tray connected to the spine between the front cover and the back cover, adjacent to the first tray, such that the first tray and second tray are positioned in the storage compartment formed by the front cover and the back cover when they are in the closed position; the second tray being pivotable with respect to the spine while remaining connected to the spine;
wherein the second tray further comprises a third hub, positioned on a first surface of the second tray and operable to retain a third optical disc, and a fourth hub, positioned on a second surface of the tray, opposite the first surface and operable to retain a fourth optical disc, wherein the third hub is offset from the fourth hub such that the third optical disc does not overlap the fourth hub and the fourth optical disc does not overlap the third hub;
wherein the second tray is positioned in the storage device adjacent to the first tray such that the first surface of the second tray is opposite the second surface of the first tray and such that the second optical disc does not overlap the third hub of the second tray and the third optical disc does not overlap the second hub of the first tray; and
wherein an opening is defined by the second tray in an area where the third optical disc overlaps the fourth optical disc.

22. The storage device for multiple optical discs of claim 21, further comprising a fastening device connected to an inner surface of the spine and operable to pivotably connect the first tray and the second tray to the spine such that both the first tray and the second tray are freely pivotable relative to the spine while remaining connected to the spine.

23. The storage device for multiple optical discs of claim 22, wherein the fastening device further comprises a first T-shaped clip positioned on a top end an inner surface of the spine and a second T-shape clip positioned on a bottom end of the inner surface of the spine, wherein each of the first and second T-shaped clips includes a base element that extends substantially perpendicularly outward from a plane of the spine and a cross element positioned at an outward end of the base element and extending substantially parallel to the plane of the spine, such that a first recess and a second recess are formed on opposite sides of the base element.

24. The storage device for multiple optical discs of claim 23, wherein the first tray includes a first rod member on a top portion of an inner edge of the first tray and a second rod member on a bottom portion of the inner edge of the first tray, wherein the first rod member and second rod member fit into at least one of the first recess and second recess of each of the first T-shaped clip and the second T-shaped clip to allow for pivoting of the first tray relative to the spine.

25. The storage device for multiple discs of claim 24, wherein the second tray includes a third rod member on a top portion of an inner edge of the second tray and a fourth rod member on a bottom portion of the inner edge of the second tray, wherein the third rod member and fourth rod member fit into the other of the first recess and second recess of each of the first and second T-shaped clips to allow for pivoting of the second tray relative to the spine.

26. The storage device for multiple optical discs of claim 25, wherein the back cover of the storage device further comprises a fifth hub operable to retain a fifth optical disc, wherein the fifth hub is positioned on an inner surface of the back cover, opposite the second surface of the second tray, and is offset from the fourth hub of the second tray such that the fourth optical disc does not overlap the fifth hub and the fifth optical disc does not overlap the fourth hub.

27. The storage device for multiple discs of claim 26, wherein the front cover further comprises a sixth hub operable to retain a sixth optical disc, wherein the sixth hub is positioned on an inner surface of the front cover, opposite the first surface of the first tray, and is offset from the first hub such that the first optical disc does not overlap the sixth hub and the sixth optical disc does not overlap the first hub.

28. The storage device for multiple optical discs of claim 27, wherein the front cover further comprises at least one retaining clip operable to retain printed information regarding the multiple discs.

29. The storage device for multiple optical discs of claim 27, wherein a thickness of the storage device when the front cover and the back cover are in the closed position is substantially 15 mm.

30. The storage device for multiple optical discs of claim 21, wherein the first hub is offset from the second hub by substantially 70 mm and wherein the fourth hub is offset from the third hub by substantially 70 mm.

31. The storage device for multiple optical disks of claim 21, further comprising a depression formed around each hub, the depressions overlapping the area where the optical disks overlap each tray.

32. The storage device for multiple optical disks of claim 20, further comprising a depression around each hub, the depressions overlapping in the area where the first optical disk and the second optical disk overlap.

33. A storage device for the storage of multiple discs comprising:
a first tray operable to secure discs; and
a second tray operable to secure discs,
two hubs for securing the discs in the storage device, wherein a first hub that is configured to receive a first disk is positioned on a first surface of each tray and a second hub that is configured to receive a second disk is positioned on a second surface of each tray, opposite the first surface, and wherein the second hub is positioned on the second surface offset from the first hub;
a first support structure positioned behind the first hub on the second surface and comprising raised regions that are raised relative to the second surface and extend to the edge of the second surface; and
a second support structure positioned behind the second hub on the first surface and comprising second raised regions that are raised relative to the first surface and extend to the edge of the first surface; wherein
the first and the second hub are positioned relative to one another so that the first disk and the second disk overlap a first region of the first tray, the first disk overlaps a second region of the first tray and the second disk overlaps a third region of the first tray, wherein the first region is thinner than the second region and the third region or includes a window, and wherein the first disk does not overlap the third region and the second disk does not overlap the second region.

34. A storage device for multiple discs comprising:
an outer cover assembly movable between an open position and a closed position and wherein a storage compartment is defined by the outer cover assembly when the outer cover assembly is in the closed position;
a first tray pivotably connected to the outer cover assembly and disposed within the storage compartment when the outer cover assembly is disposed in the closed position;
the first tray including outer perimeter wall portions and a base wall disposed inwardly of the outer perimeter wall portions; the base wall defining a first surface and a second surface; the first surface facing an opposite direction compared to the second surface;
the first tray including a first hub and a second hub;
the first hub projecting from the first surface of the base wall of the first tray and being operable to retain a first disc adjacent to the first surface;
the second hub projecting from the second surface of the base wall of the first tray and being operable to retain a second disc adjacent to the second surface;
the second hub being offset from the first hub; and
a first support structure positioned behind the first hub on the second surface and comprising raised regions that are raised relative to the second surface and extend to the edge of the second surface; and
a second support structure positioned behind the second hub on the first surface and comprising second raised regions that are raised relative to the first surface and extend to the edge of the first surface; wherein
the first and the second hub are positioned relative to one another so that the first disk and the second disk overlap a first region of the first tray, the first disk overlaps a second region of the first tray and the second disk overlaps a third region of the first tray, wherein the first region is thinner than the second region and the third region or includes a window, and wherein the first disk does not overlap the third region and the second disk does not overlap the second region.

35. The storage device for multiple discs of claim 34, wherein the base wall of the first tray defines an opening at the central area.

36. The storage device for multiple discs of claim 34, further comprising:
a second tray pivotably connected to the outer cover assembly adjacent to the first tray, such that the entire first tray and the entire second tray are positioned within the storage compartment when the outer cover assembly is in the closed position;
the second tray including outer perimeter wall portions and a base wall disposed inwardly of the outer perimeter wall portions; the base wall defining a first surface and a second surface; the first surface facing an opposite direction compared to the second surface;
the second tray including a third hub and a fourth hub;
the third hub projecting from the first surface of the base wall of the second tray and being operable to retain a third disc adjacent to the first surface;
the fourth hub projecting from the second surface of the base wall of the second tray and being operable to retain a second disc adjacent to the second surface;
the fourth hub being offset from the third hub;
the base wall of the second tray defining a central area and a pair of end portions;
the central area having a thickness that is less than the thickness of the end portions; and
the third and fourth hubs being arranged so that the discs overlap at the central area.

37. The storage device for multiple discs of claim 36, wherein the outer cover assembly includes a front cover and a back cover; the back cover of the storage device includes a fifth hub operable to retain a fifth disc, wherein the fifth hub is positioned on an inner surface of the back cover, opposite the second surface of the second tray, and is offset from the fourth hub;

the front cover including a sixth hub operable to retain a sixth disc, wherein the sixth hub is positioned on an inner surface of the front cover opposite the first surface of the first tray, and is offset from the first hub of the first tray; and a thickness of the storage device when the front cover and the back cover are in the closed position is substantially 15 mm.

38. The storage device for multiple discs of claim 34, wherein each hub is positioned on the tray and the base wall of the tray is configured to cause a portion of a disc disposed on the hub to extend outwardly from the base wall to provide the user access to the disc.

* * * * *